March 19, 1968  T. H. TERRY ET AL  3,373,831
CONTROL SYSTEM FOR MULTIPLE DRIVE AXLES
Filed Dec. 2, 1964  4 Sheets-Sheet 1

INVENTORS
THOMAS H. TERRY
GEORGE L. MOLDOVAN
BY
Woodhams, Blanchard & Flynn
ATTORNEYS

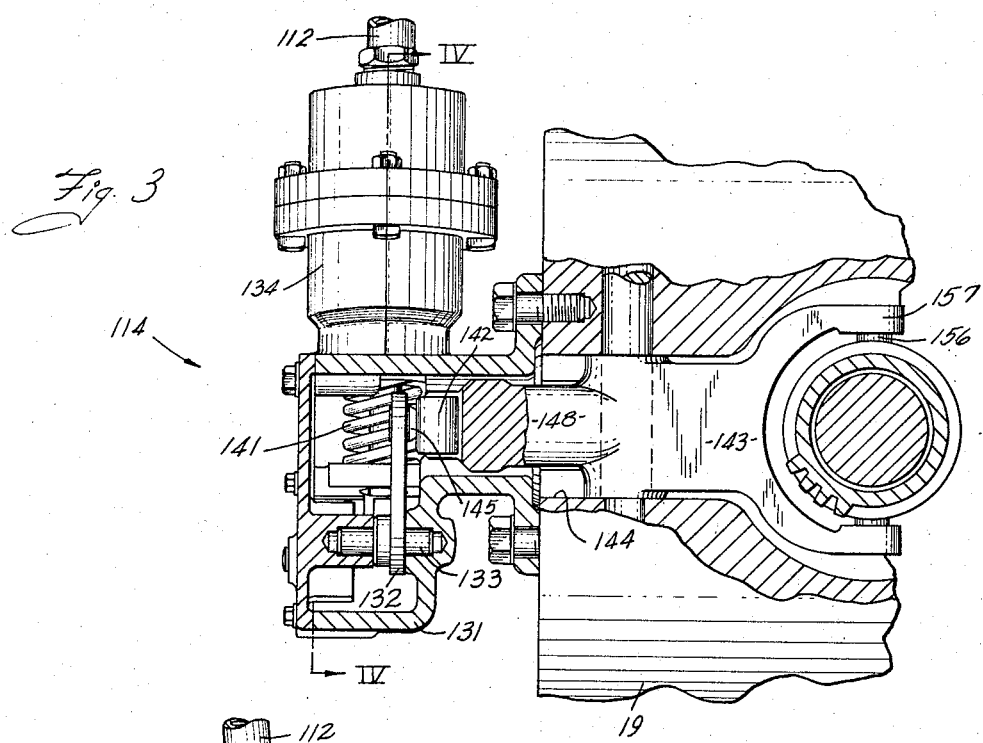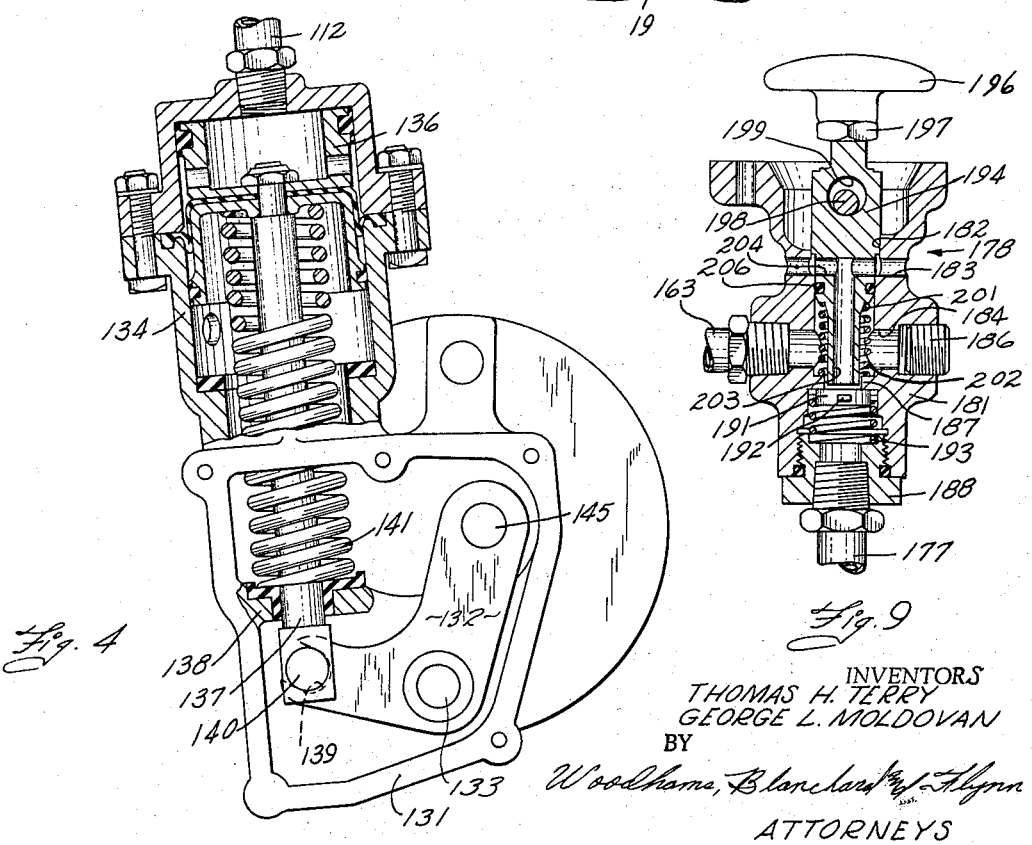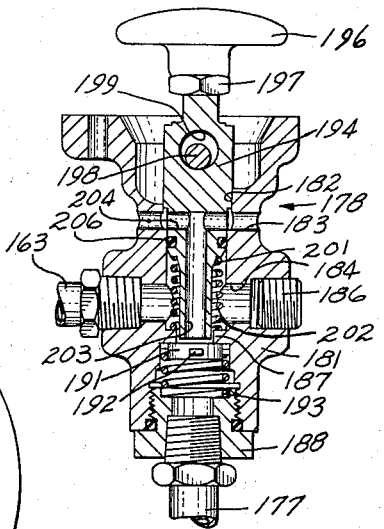

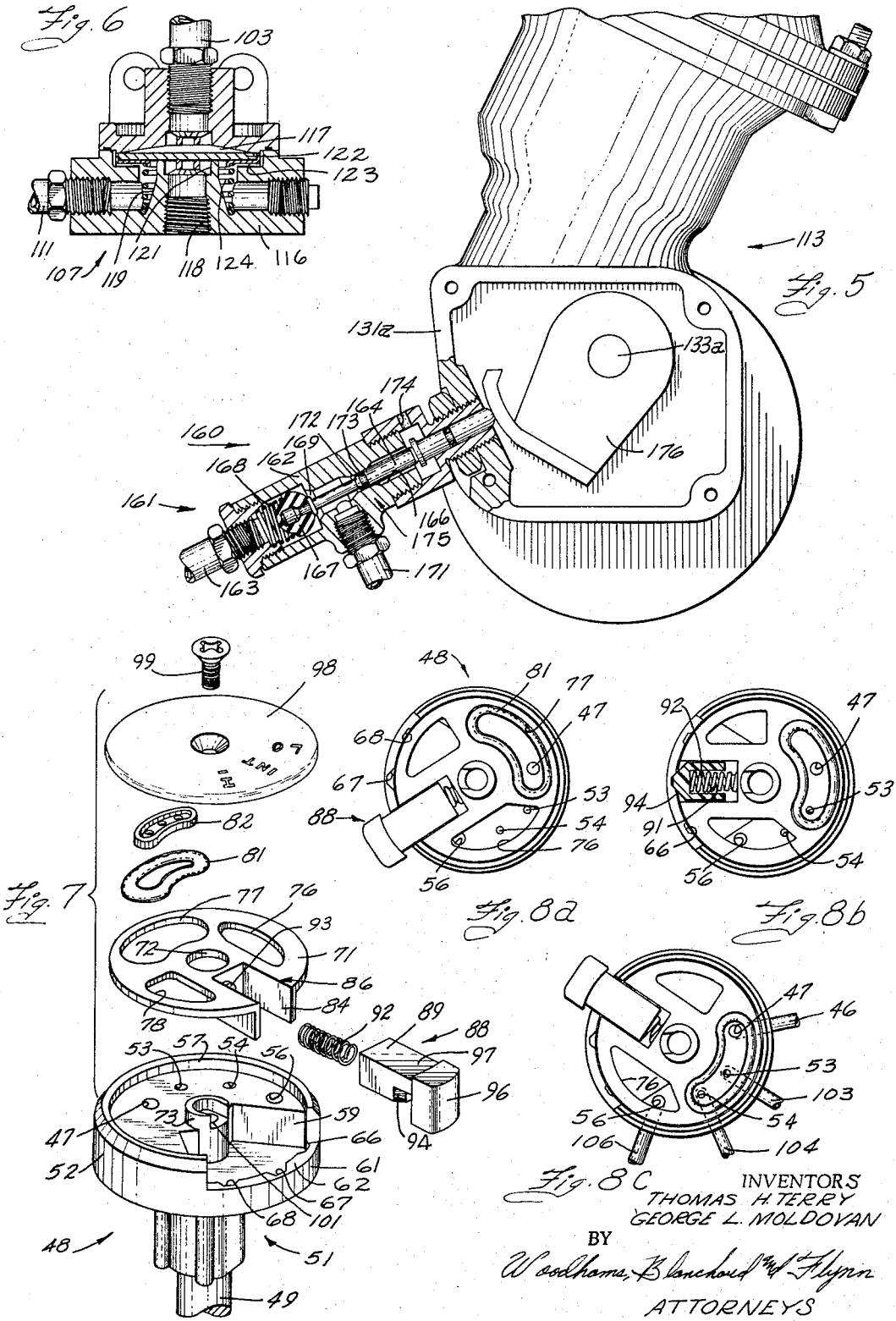

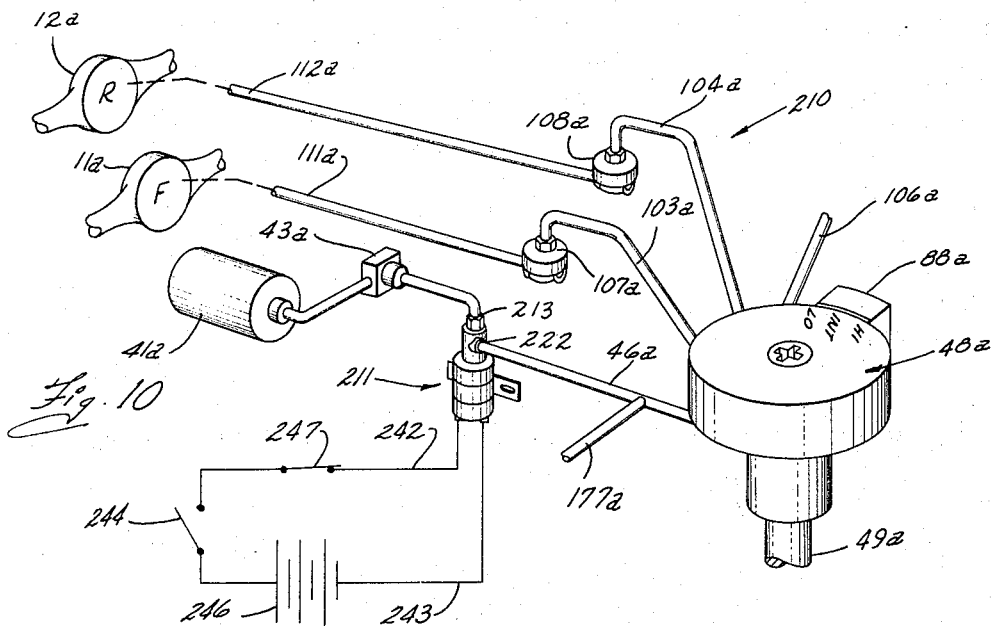
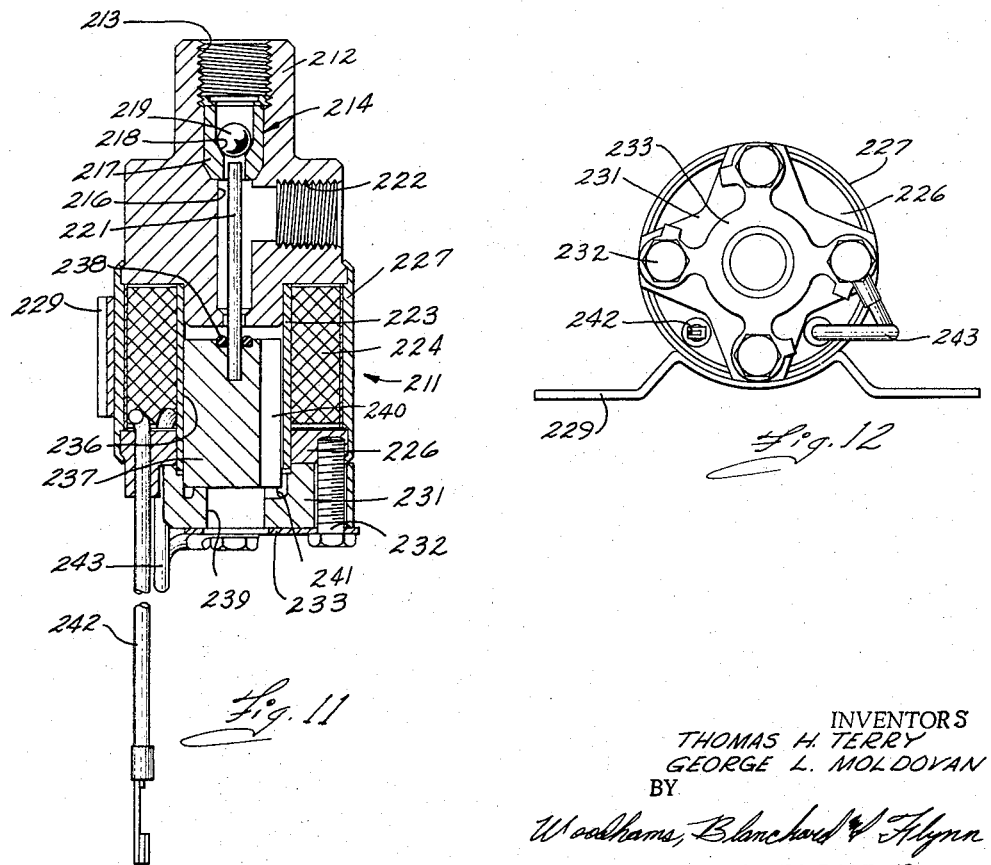

United States Patent Office 3,373,831
Patented Mar. 19, 1968

3,373,831
CONTROL SYSTEM FOR MULTIPLE DRIVE AXLES
Thomas H. Terry, Bay Village, and George L. Moldovan, Willowick, Ohio, assignors to Eaton Yale & Towne Inc., a corporation of Ohio
Filed Dec. 2, 1964, Ser. No. 415,431
12 Claims. (Cl. 180—22)

ABSTRACT OF THE DISCLOSURE

A control system for a multiple axle mechanism comprising a plurality of multispeed drive axles which are connected by interaxle differential means, the control system having a manually operable selector valve for selectively connecting the shifting means of the drive axles to a source of pressure fluid in order to shift the axles.

This invention relates to a multiple speed axle control and, more particularly, relates to a control system for a tandem, multiple speed axle assembly actuable to place said assembly in any one of at least three gear ratios.

The control system of the present invention may, for example, be used with an axle assembly substantially similar to that described in Patent No. 3,146,842, granted Sept. 1, 1964.

In the afore-mentioned patent, an electrically operated control is described for use with a tandem pair of two-speed driven axles. The driven axles are connected by an interaxle differential and, hence, can be driven at different gear ratios with respect to each other for the purpose of obtaining a net intermediate gear ratio. The control system of the afore-mentioned patent is arranged to shift the gear ratio of each of the pair of two-speed axles in a manner to select any one of three different axle assembly gear ratios.

Although the previous control system has proven successful in many situations, it contains electrical as well as pressure fluid circuitry and is relatively complex and indirect in its action. Such complexity may, in certain instances, be undesirable from the standpoint of manufacturing, installation, maintenance cost, system reliability and long life.

Thus, in a continuing effort to produce an improved control system for selecting the gear ratios of such multiple speed, differential coupled, driven axle assemblies, the control system embodying the present invention has been developed.

Accordingly, the objects of this invention include:

(1) To provide a control system for a differential coupled, multispeed axle assembly by means of which the axle assembly may be shifted to a selected one of a number of gear ratios in excess of the number of ratios provided by any one axle and which is capable of shifting an axle assembly comprising a tandem pair of differential coupled two-speed axles through at least three different gear ratios.

(2) To provide a control system, as aforesaid, which is considerably simpler than the control system described in the afore-mentioned Patent No. 3,146,842.

(3) To provide a control system, as aforesaid, which can be maintained by persons presently trained in maintaining conventional multispeed axle equipment with little or no additional training and which will be capable of a long and reliable service life with a minimum of maintenance.

(4) To provide a control system, as aforesaid, which, if desired, may include locking means for locking the interaxle differential and, hence, rendering same ineffective as for use in difficult terrain and which control system assures both axles are in their lower position when the interaxle differential is locked.

(5) To provide a control system, as aforesaid, which includes only pressure fluid circuitry, usually air energized, which provides a fail-safe feature whereby, in the event of failure of the control system or its air supply, the axles will automatically be returned to their low gear positions so that operation of the vehicle can continue.

Other objects and purposes of this invention will be apparent to persons acquainted with apparatus of this general type upon reading the following specification and inspecting the accompanying drawings.

In the drawings:

FIGURE 3 is an enlarged sectional view substantially as taken on the line III—III of FIGURE 2.

FIGURE 4 is an enlarged sectional view substantially as taken on the line IV—IV of FIGURE 3.

FIGURE 5 is an enlarged, partially broken, front elevational view of the forward drive axle of FIGURE 1.

FIGURE 6 is a central cross-sectional view of a quick release valve used in the control system of FIGURE 1.

FIGURE 7 is an exploded, oblique view of the selector valve of the control system of FIGURE 1.

FIGURES 8a–8c are top elevational views of the selector valve of FIGURE 7 with the cover and O-ring retainer removed therefrom and showing said selector valve in its low, intermediate and high settings, respectively.

FIGURE 9 is a central cross-sectional view of a lockout initiating valve used in the control system of FIGURE 1.

FIGURE 10 is an oblique partially diagrammatic view substantially comprising a fragment of FIGURE 1 and illustrating a modification thereof.

FIGURE 11 is a central cross-sectional view of a solenoid valve utilized in the device shown in FIGURE 10.

FIGURE 12 is a bottom view of the solenoid valve of FIGURE 11.

Figure 1:
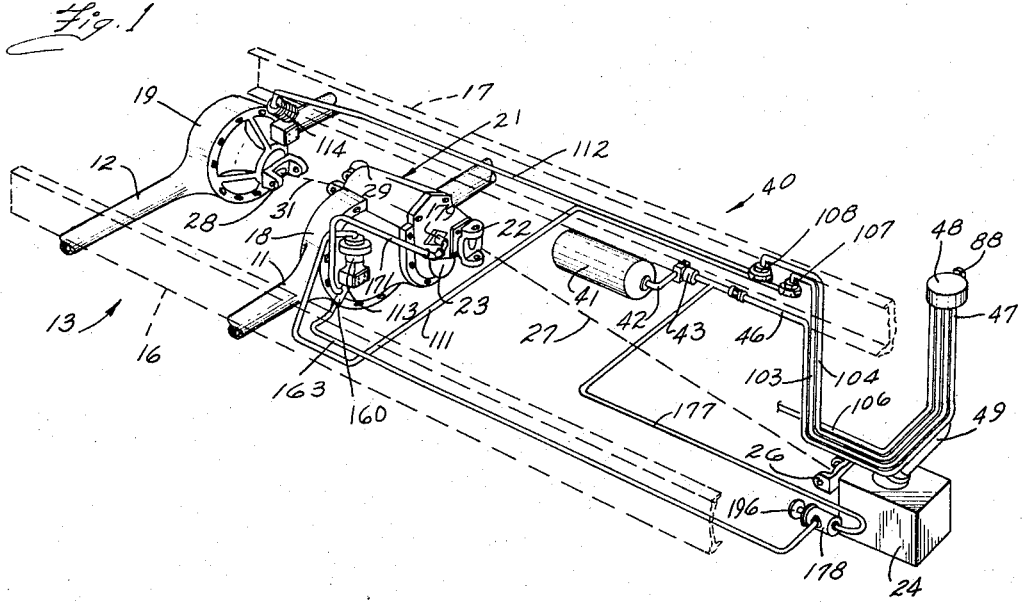
FIGURE 1 is an oblique fragmentary, partially phantom, view of a vehicle which includes a control system embodying the invention.
Figure 2:
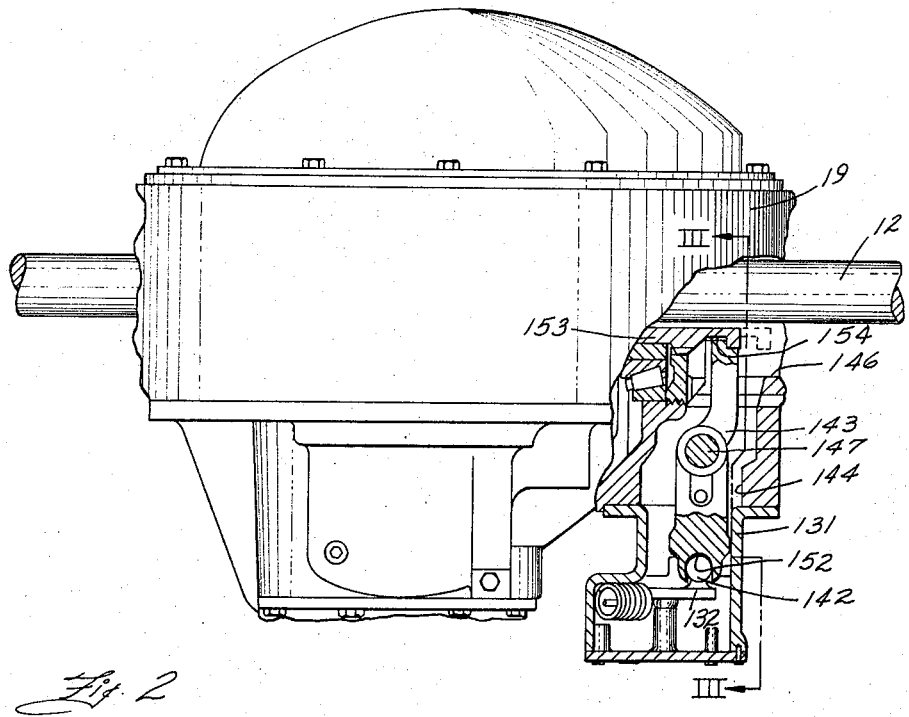
FIGURE 2 is an enlarged, partially broken, fragmentary top view of the rearward drive axle of the vehicle of FIGURE 1.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the normal forward and reverse direction of travel of the vehicle to which the control system is attached, such directions being to the right and left, respectively, in FIGURE 1. The words "inwardly" and "outwardly" will refer to directions toward and away from, respectively, the geometric center of the device and designated parts thereof. Said terminology will include the words specifically mentioned, derivatives thereof and words of similar import.

General description

In general, the objects and purposes of this invention are met by providing a control system for an axle assembly comprising a tandem pair of multiple, for example two, speed axles driven through an interaxle differential, said axles normally being of the type supporting and driving a vehicle. The control system includes a selector valve mounted substantially like a conventional gear shaft knob upon the actuating lever of the vehicle transmission and connected to a source of fluid, usually air, under pressure. A pressure fluid cylinder is mounted on each axle and connected to the selector valve for shifting said axle. The selector valve includes a handle actuable to alternatively place both axles in a low speed gear ratio, one in a high speed gear ratio (i.e., high gear)

with the other in a low speed, gear ratio (i.e., low gear) and both in a high speed, gear ratio to thereby produce three different over-all axle assembly gear ratios. A blocking valve is connected in series with the source, a manually actuable initiating valve and a further pressure fluid cylinder actuable for locking the interaxle differential. The blocking valve is actuated with one of the axles, the sequence of the selector valve insuring that the blocking valve will be opened for allowing the differential to be locked only when both axles are in a low gear.

*Detailed description*

Referring to FIGURE 1, forward and rearward, multispeed, drive axles 11 and 12, respectively, are mounted by any convenient means, not shown, on the frame members indicated by broken lines 16 and 17 of a vehicle. The axles 11 and 12 include enlarged portions 18 and 19, respectively, for housing preferably conventional differential and change speed gearing, not shown, which change speed gearing is capable of providing a plurality, two in the particular embodiment shown, of gear ratios in any conventional manner. An interaxle differential 21 is affixed to the enlarged portion 18 of the front axle 11 and is of any convenient construction. A universal member 22 extends forwardly from a gear case 23 on the front of the differential 21 and is connected through preferably conventional gearing in the gear case 23 to the differential 21 and to the forward axle 11. The transmission 24 of the vehicle 13 includes a rotatable output member 26 which is connected to the universal member 22 through a conventional drive shaft indicated by the broken line 27 for rotatably driving same. An input universal member 28 on the rearward axle 12 and an output universal member 29 on the interaxle differential 21 are connected by a drive shaft indicated by the broken line 31 so that the rear axle 12 is driven through the differential 21. The afore-mentioned mechanism may be of any convenient type and, in the particular embodiment shown, is substantially similar to that disclosed in the afore-mentioned Patent No. 3,146,842.

Turning now to the control system 40 embodying the invention, the same includes a source 41 of fluid under pressure. For purposes of illustration only, the source 41 will be considered a compressed air tank fed from any convenient pressurizing device such as a compressor, not shown. The tank 41 connects through a line 42 to a pressure protection valve 43 which allows air flow therethrough as long as the pressure at the outlet end thereof is above a preselected value, for example, 65 p.s.i. Although pressure protection valve 43 is illustrated and described, said valve is not necessary or critical to the operation of the control system. The protection valve 43 connects through a conduit 46 to the inlet 47 of a manually actuable, speed ratio selector valve 48. The selector valve 48 is shaped substantially as a conventional gear shift knob and is mounted upon the gear shift lever 49 of the vehicle transmission 24.

In the particular embodiment shown, the selector valve 48 (FIGURE 7) includes a stepped, substantially cylindrical body 51 having a radially enlarged head 52. The inlet opening 47, a forward axle opening 53, a rearward axle opening 54 and an exhaust opening 56 are circumferentially spaced from each other and extend axially downwardly through the head 52 from an annular recess 57 in the upper face of the head 52. A substantially wedge-shaped well 59 extends radially across the recess 57 and is circumferentially disposed between the inlet and exhaust openings 47 and 56 and opposite the openings 53 and 54. The peripheral wall 61 of the well 59 has an upper edge 62 which is of reduced height intermediate the circumferential ends of the well 59. Vertical, detent grooves 66, 67 and 68 are spaced along the inner surface of the peripheral wall 61 at locations corresponding to the spacing of adjacent ones of the openings 47, 53, 54 and 56.

A valve plate 71 is normally pivotally received within the recess 57, and has a central opening 72 snugly slideable over the central post 73 defined in the head 52 by the annular recess 57. An exhaust aperture 76, a valve aperture 77 and a further aperture 78 are circumferentially elongated and are circumferentially arranged in the plate 71. A resilient seal, such as a rubber O-ring 81, is at least slightly thicker than the depth of the recess 57. The O-ring 81 normally lies in the valve aperture 77 and is maintained in substantially continuous contact with the peripheral wall of said aperture 77 by a holed and recessed retaining web 82. A rectangular slot 86 extends radially into the plate 71 between the apertures 76 and 78. Integral rectangular walls 84 depend continuously from the edges of the slot 86 and extend downwardly into the well 59 to limit the range of pivotal motion of the plate 71 with respect to the head 52.

An actuating handle 88 includes a substantially rectangular body 89 which is snugly slideable between the walls 84. An inwardly facing opening 91 (FIGURE 8b) in the body 89 receives the outer end of a cylindrical spiral compression spring 92. The spring 92 extends into the slot 86 and bears against the innermost one of the walls 84, the spring being located thereon by a suitable stud 93 (FIGURE 7). The spring 92 urges the outer end 94 of the body 89 outwardly and when the body is aligned with one of the detent grooves 66, 67 or 68, said spring urges said body thereinto. The vertical edges of the outer end 94 of the body 89 are chamfered for allowing the handle 88 to be moved radially from one detent groove to another. A manually actuable thumb button 96 is spaced outwardly from the body 89 and peripheral wall 61 by an integral bridge 97 which passes above the upper edge 62 of the peripheral wall 61 and is connected to the body 89.

A cover disk 98 is fixed by a screw 99 atop the body 51 for closing the top of the recess 57. The disk 98 is preferably fixed against circumferential movement on the body 51 by a suitable depending integral key, not shown, which engages a slot 101 in the post 73. The cover disk 98 has suitable indicia, here the designations "Lo," "Int" and "Hi," located above the detent grooves 66, 67 and 68, respectively, for indicating to the vehicle operator the axle assembly gear condition selected by the actuating handle 88. To select the axle assembly low gear condition, the actuating handle 88 is engaged in the detent groove 66 (FIGURE 8a). In such position, the valve aperture 77 communicates only with the supply opening 47 and the forward and rearward axle openings 53 and 54 are vented to the exhaust opening 56 by the exhaust aperture 76. A clockwise rotation of the actuating handle 88 to the next or intermediate detent groove 67 (FIGURE 8b) places the valve aperture 77 in communication with the supply opening 47 and forward axle opening 53 while the exhaust aperture 76 communicates with the exhaust opening 56 and rearward axle opening 54. Further clockwise rotation of the handle 88 into the detent 68 (FIGURE 8c) corresponding to the axle assembly high gear condition places valve aperture 77 in communication with the supply opening 47 and both of the axle openings 53 and 54 and places the exhaust aperture 76 in communication with the exhaust opening 56.

The openings 53, 54 and 56 communicate as indicated in FIGURE 8c with respective conduits 103, 104 and 106 which with the afore-mentioned supply conduit 46 are preferably of a suitable pressure resistant and flexible material such as nylon tubing. The conduits 46, 103, 104, and 106 preferably extend downwardly from the selector valve 48 along the shift lever 49 (FIGURE 1) and may be held thereto by any convenient hardness, not shown. If desired, the shift lever 49 may comprise a hollow tube and the conduits 46, 103, 104 and 106 may be enclosed therewithin to exit therefrom near or under the floor of the vehicle cab.

The exhaust conduit 106 may be terminated at any convenient point and may simply be exhausted to the atmosphere when the pressure fluid used in the system is air. The forward and rearward axle conduits 103 and 104, respectively, connect through quick release valves 107 and 108, respectively, and thence through further conduits 111 and 112, respectively, to shift units 113 and 114 mounted on the front and rear axles 11 and 12, respectively.

The quick release valves 107 and 108 are preferably identical. The valve 107 may be of any desired construction capable of exhausting the line 111 upon a predetermined drop in pressure in the line 103. FIGURE 6 discloses, for purposes of illustration only, a particular type of quick release valve 107 which was used in the embodiment of the invention shown in FIGURE 1. The valve 107 includes a housing 116 containing a flat circular chamber 117. The chamber 117 communicates at its center upwardly with the conduit 103 and downwardly with an exhaust opening 118 which exhausts either directly or through suitable conduit means, not shown, to the atmosphere. An annular recess 119 communicates at its upper end with the chamber 117 and coaxially surrounds and is radially spaced from the exhaust opening 118 by an annular shoulder 121. The annular recess 119 also communicates with the conduit 111. A flexible disk 122 of diameter slightly less than the chamber 117 is located in said chamber and normally seats on the annular shoulder 121 to seal the exhaust opening 118. In the absence of an air pressure differential between the conduits 103 and 111, the edge of the disk 122 is held against the ceiling of the chamber 117 to prevent communication between said conduits 103 and 111 by an annular retainer 123 backed by a cylindrical spiral compression spring 124 disposed in the annular recess 119. Pressurization of the conduit 103 forces the disk 122 downwardly away from the ceiling of the chamber 117 thereby connecting the conduits 103 and 111. Conversely, a drop in pressure in the conduit 103 sufficiently below the pressure in the conduit 111 lifts the center of the disk 122 upwardly away from the shoulder 121 and connects the conduit 111 and the exhaust opening 118. Thus, the valve 111 allows substantially free air flow therethrough for pressurizing the shift unit 103 from the conduit 103 and allows the shift unit 113 to exhaust without having to do so through the conduit 103, valve 48 and exhaust line 106 thereby cutting the time required to exhaust the front shift unit 113.

The shift units 113 and 114 are preferably substantially identical and, hence, only one thereof, the unit 114, is described in detail. Insofar as reference is made hereinbelow to the shift unit 113, parts thereof corresponding to parts of the shift unit 114 will be referred to by the same reference numerals thereas but with the suffix "a" added thereto. The shift unit 114 may be of any convenient construction capable upon pressurization of upshifting the axle 12 to high gear and capable of downshifting the axle to low gear upon depressurization. Such shifting will take place when the torque load on the axle is below a preselected value.

In the preferred embodiment shown, the rearward shift unit 114 (FIGURES 1–4) includes a crank housing 131 which is affixed to the enlarged portion 19 of the axle 12. A generally L-shaped bell crank 132 is mounted by a substantially horizontal and central pivot 133 on and within the crank housing 131. A pressure fluid cylinder 134 extends substantially upwardly from the crank housing 131 and is connected at the upper end thereof to the conduit 112. A piston 136 is reciprocable in the cylinder 134 and includes seal means for preventing air leakage therepast. A connecting rod 137 is affixed to the piston 136 and extends downwardly therefrom through a fixed guide 138 in the crank housing 131. The lower end of the connecting rod 137 includes a pin 140 which is pivotally and slideably received in a groove indicated in broken lines at 139 in the leftward (FIGURE 4) end of the bell crank 132. A compression spring 141 is coaxially disposed on the connecting rod 137 between the guide 138 and piston 136 to urge the piston upwardly toward the outer end of the cylinder 134. The remaining or upper (FIGURE 3) end of the bell crank 132 has a substantially upstanding, circularly cylindrical actuator knob 142 pivotally affixed to the rearward face thereof by a pivot pin 145.

A chamber 144 (FIGURES 2 and 3) in the portion 19 extends substantially forwardly from the axle cavity 146 of the portion 19 into communication with the interior of the housing 131. A lever 143 lies in the chamber 144 and is pivotally supported intermediate the ends thereof on a substantially vertical shaft 147 which is pivotally fixed with respect to the portion 19. The forward end 148 of the lever 143 extends forwardly into the interior of the crank housing 131 and is preferably vertically grooved as indicated at 152 for slideably receiving the cylindrical actuator knob 142 on the bell crank 132. This connection of the lever 143 and bell crank 132 allows relative movement therebetween to the extent required by the pivotal mounting of the lever 143 during actuation of the lever 143 by the bell crank 132. Also, as the bell crank 132 is pivoted, the knob 142 pivots with respect thereto by a relatively small but definite amount, the knob 142 thereby remaining aligned with the groove 152.

The change speed gearing, not shown, within the portion 19 is shiftable by axial movement of the sleeve 153 substantially as indicated in the afore-mentioned Patent No. 3,146,842. The sleeve 153 is annularly grooved at 154 for receiving actuating fingers 156 (FIGURE 3) which extend radially into said groove 154 from a yoke 157 integral with the rearward end of the lever 143. Thus, pressurization of the conduit 112 exerts a downward force on the piston 136 which tends to move same against the upward urging of the spring 141 to impart a counterclockwise (FIGURE 4) pivotal movement to the bell crank 132. Such motion of the bell crank 132 is transferred through the knob 142 to cause a corresponding clockwise (FIGURE 2) pivotal movement of the lever 143 about the axis of the shaft 147 whereby to move the sleeve 153 rightwardly to a position indicated in broken lines in FIGURE 2 and, hence, shift the axle into its high gear position. It will be understood that such shifting will take place only when the torque loading on the axle is reduced below a predetermined minimum level. While such torque loading is above such level, the piston 136 will not move in response to the pressurization of the line 112. Exhausting of the conduit 112 allows the spring 141 to move the piston 136 upwardly into its uppermost position and, hence, to return the bell crank 132, lever arm 143 and sliding sleeve 153 to their initial positions shown in FIGURES 2 and 4. As a result, the axle 11 is returned to its low gear position.

A blocking unit 160 (FIGURE 5) is added to one of the shifting units 113 and 114, here the shifting unit 113 associated with the front axle 11. The blocking unit 160 includes a housing 162 which is affixed to and extends from the shift unit housing 131a substantially radially of the pivot shaft 133a. A central opening 166 extends longitudinally through the housing 162 and communicates at its outer end with an air supply conduit 163. A resilient ball 167 is mounted on the outer or leftward (FIGURE 5) end of a spindle 164 slideably disposed in the central opening 166. A spring 168 urges the ball 167 inwardly toward the shift unit housing 131a and against a suitable seat 169 in the central opening 166, the ball 167 and seat 169 comprising the control elements of a blocking valve 161. An outlet conduit 171 communicates with the central opening 166 to the right of the seat 169 whereby closure of the ball 167 against the seat 169 prevents air flow from the conduit 163 into the conduit 171. The central opening 166 has a radially reduced portion 172 located to the right of the conduit 171 which is engaged by an O-ring 173 on the spindle 164 when the spindle 164 is in its outermost or leftwardmost position as shown in FIGURE 5 to prevent air from the conduits 163 and 171 from passing rightwardly therepast, the portion 172 and O-ring 173 defining the closeable parts of a venting valve 175. An opening 174 vents the central opening 166 to the atmosphere to the right of the reduced portion 172. Thus, when the ball 167 is in contact with the seat 169, the O-ring 173 is positioned rightwardly of the reduced portion 172 to exhaust the conduit 171 therepast and through the vent opening 174 to the atmosphere.

A cam 176 is fixed to the pivot shaft 133a for rotation therewith. The position of the cam 176 shown in FIGURE 5 corresponds to the low gear position of the associated forward axle 11. In such position, the cam 176 displaces the inner end of the spindle 164 outwardly to unseat the ball 167 and, hence, connect the conduit 163 to the conduit 171. On the other hand, when the pivot shaft 133a is rotated in a counterclockwise direction to shift the axle 11 into high gear, the cam 176 disengages the spindle 164 and the spring 168 moves the spindle 164 and ball 167 inwardly to seat said ball for blocking the end of the conduit 163 and for exhausting the conduit 171 through the opening 174.

The outlet of the pressure protective valve 43 (FIGURE 1) also connects through a conduit 177 to a manually actuable initiating valve 178. The valve 178 is in turn connected to the afore-mentioned conduit 163 and thereby to the blocking unit 160.

In the particular embodiment shown, the initiating valve 178 comprises an elongated housing 181 (FIGURE 9) having a central opening 182 extending therethrough. An exhaust passage 183 open to the atmosphere extends preferably diametrically through the housing 181 and communicates with the central opening 182 adjacent the upper end thereof. A transfer passage 184 extends preferably diametrically through the housing 181 and communicates with the central opening 182 to a point spaced below the exhaust passage 183. The rightward end of the transfer passage 184 is closed by a pipe plug 186 and the leftward end of the transfer passage 184 communicates through a suitable fitting with the afore-mentioned conduit 163. An annular flange 187 extends radially into the central opening 182 below the transfer passage 184. An annular spring retainer 188 is threaded into the bottom end of the central opening 182 and lies spaced below the flange 187. The afore-mentioned conduit 177 communicates by means of a suitable fitting through the annular spring retainer 188 with the lower end of the central opening 182. A valve disk 191 is disposed in the central opening 182 below the flange 187 and has a plurality of radially outwardly extending ears 192. A helical compression spring 193 rests on the upper face of the spring retainer 188 and extends upwardly therefrom into contact with the ears 192 for resiliently urging the valve disk 191 against and into sealing contact with the lower face of the annular flange 187 to prevent flow from conduit 177 to the conduit 163 thereabove.

An elongated plunger 194 is snugly but slideably inserted in the upper end of the central opening 182. The upper end of the plunger 194 threadably supports a manually actuable push button 196 and lock nut 197 above the housing 181. A pin 198 is fixed by any convenient means, not shown, to the upper end of the housing 181 and extends across the upper end of the central opening 182. The plunger 194 has a preferably diametrical hole 199 therethrough which exceeds the diameter of and telescopes the pin 198. Interference between the walls of the hole 199 and the pin 198 determines the limits of axial motion of the plunger 194 with respect to the housing 181. The lower end of the plunger 194 is of reduced diameter for defining a downwardly facing shoulder 201. A helical spring 202 is substantially coaxially disposed over the lower end of the plunger 194 and is compressed between the shoulder 201 and the annular flange 187 to urge the plunger 194 upwardly toward its position of FIGURE 9 in the absence of manual depression of the push button 196. The lower end of the plunger 194 is loosely receivable downwardly through the flange 187. In its uppermost position shown, the lower end of the plunger 194 is spaced above the valve disk 191 but upon manual actuation thereof slides further downwardly through the flange 187, contacts the valve disk 191 and pushes same downwardly away from the flange 187 to allow fluid flow from the conduit 177 upwardly therepast and out the conduit 163.

A central passage 203 extends from the bottom end of the plunger 194 upwardly into communication with a preferably diametrically disposed opening 204 which extends through the plunger 194. The pin 198 coacts with the opening 199 to maintain the plunger 194 against substantial circumferential movement with respect to the housing 181 and hence maintains the axis of the opening 204 substantially parallel to the axis of the exhaust passage 183. A resilient seal member, here an O-ring 206, is disposed in an annular groove in the plunger 194 between the opening 204 and shoulder 201 to prevent air leakage from the conduit 177 upwardly therepast to the exhaust passage 183.

Thus, when the plunger 194 is in its uppermost position shown, as urged by the spring 202, the opening 204 communicates with the exhaust passage 183 to allow the conduit 163 to exhaust through the central passage 203 and opening 204 of the plunger 194 and out the exhaust passage 183 in the housing 181. When, on the other hand, the plunger 194 is pushed to its inwardmost or downwardmost position, the opening 204 slides downwardly out of communication with the exhaust opening 183 and the bottom end of the opening 203 is closed by contact with the upper face of the disk 191, to prevent exhausting of the conduits 163 and 177 through the exhaust passage 183.

A pressure fluid cylinder 179 is affixed to the interaxle differential 21 and is energizable to lock said interaxle differential 21 for providing a solid connection between the axles 11 and 12, preferably substantially in the manner disclosed in the afore-mentioned Patent No. 3,146,842. The cylinder 179 is connected by the afore-mentioned conduit 171 to the blocking unit 160 for energization thereby and unlocks said differential 21 upon depressurization of the line 171. Therefore, opening of the valve 178 allows air from the source 41 to pass through the conduits 177 and 163 to the blocking unit 160. The blocking unit 160 will seal the end of the conduit 163 unless the forward axle 11 is in low gear, in which case the unseated ball 167 allows pressurization of the conduit 171 from the conduit 163 to lock the interaxle differential 21.

*Operation*

Although the operation of the control system 40 embodying the invention has been disclosed somewhat above, the same will now be briefly described to insure a full understanding of the invention. The following discussion assumes the source 41 to contain air under the required pressure. With the handle 88 of the selector valve 48 in its "Lo" position of FIGURE 8a, air supplied to said selector valve by the supply conduit 46 remains in the valve aperture 77 and the conduits 103 and 104 from the driven axles 11 and 12 vent to the atmosphere through the exhaust opening 56 in the selector valve 48. As a result, the conduits 111 and 112 are vented by the quick release valves 107 and 108.

In the present embodiment, the interaxle differential 21 may be locked, if desired, to directly connect the driven axles 11 and 12 only when said axles are both in their low gear positions. To effect such locking, the vehicle operator must manually depress the push button 196 to open the valve 178. Opening of the valve 178 allows air flow through the conduit 163 to the blocking valve 161. With the forward axle 11 in its low gear position, the cam 176 (FIGURE 5) unseats the ball 167 of the valve 161 to energize the pressure fluid cylinder 179 through the conduit 171 and, hence, lock said interaxle differential 21. In order for the interaxle differential to remain in a locked condition, the vehicle operator must continue to depress the push button on valve 178. When the vehicle operator removes his hand from the push button on valve 178, said valve 178 will vent conduit 163 to the atmosphere thereby venting conduit 171 and pressure cylinder 179 to the atmosphere through the open blocking valve 161.

Since in the particular embodiment shown, the interaxle differential is not automatically energized upon a shift of the axle assembly from its low gear condition, the operator of the vehicle must release the push button 196 of the valve 178 prior to shifting, and preferably prior to preselecting a shift, from the axle assembly low gear condition. If desired, the valve 178 may be located near the selector valve 48 in a position such that the operator will normally use the same hand to actuate both valves. Thus, the operator, under such circumstances, must release the valve 178 and thereby energize the interaxle differential in order to preselect a shift out of the axle assembly low gear condition.

With the interaxle differential energized, the vehicle operator may preselect an axle assembly shift from the axle assembly low gear condition into either intermediate (corresponding to the legend "Int." on the cover disk 98) or high (corresponding to the legend "Hi" on the cover disk 98), for example, the former. Preselection of the axle assembly intermediate gear condition is effected by moving the handle 88 to its position of FIGURE 8b under the cover disk legend "Int." thereby pressurizing the lines 103 and 111 leading to the front axle shift unit 113 while maintaining the lines 104 and 112 to the rear axle shifting unit 114 vented. The air pressure in the line 111 will cause the shift unit 113 to shift the axle 11 into high gear in the manner described hereinabove with respect to the rearward axle shift unit 114 but such shifting takes place only after the torque load has been released from the axle 11, such release normally being accomplished in a conventional manner such as by declutching the vehicle engine or changing the engine speed. The pivot shaft 133a of the shift unit 113 and, hence, the cam 176 begins its counterclockwise rotation as said shift unit 113 begins its shifting operation. The cam 176 releases the end of the spindle 164 as it rotates which closes the blocking valve 161 to seal the line 163 and opens the venting valve 175 to vent the line 171. Thus, once the forward axle 11 is in high gear and, hence, with the axle assembly in either its intermediate or high gear condition, opening of the initiating valve 178 cannot lock the differential 21 because the spring 168 maintains the blocking valve 161 closed to prevent pressurization of the conduit 171 and pressure fluid cylinder 179.

Shifting to the axle assembly high gear condition is accomplished simply by moving the handle 88 to its position of FIGURE 8c under the cover disk legend "Hi" which connects the previously exhausted rear axle supply lines 104 and 112 to the supply line 46 along with front axle lines 103 and 111. Thus, in the manner above described, the rear axle shift unit 114 will cause the rear axle 12 to shift to high gear whereby both the axles 11 and 12 are in high gear, said shift taking place after release of torque loading on the axle 12 as above described with respect to the shifting of the axle 11. Downshifting of the axles 11 and 12 is accomplished by reversing the above-described upshifting procedure and needs no further description. In downshifting as well as in upshifting, axle assembly ratios need not be selected in sequence and, for example, axle assembly shifts may be made from low to high without engaging the axle assembly intermediate gear.

It will be recognized that the control system 40 may be modified, if desired, to allow locking of the interaxle differential 21 when the axles 11 and 12 are each in high gear rather than in low gear as above described. However, such a modification is not always desired since the locked differential is usually most useful in the face of conditions involving poor traction such as mud, snow or the like, in which the vehicle is normally operated at low speed and, hence in axle assembly low gear.

Moreover, it will be recognized that the blocking unit might be associated, if desired, with the rear axle 12 rather than the front axle 11 as above described. In such case, the selector valve connections to the axles 11 and 12 are preferably reversed, for example, by connecting the lines 103 and 104 to the openings 54 and 53, respectively, so as to insure that both axles will be in the same gear ratio, here both in low gear, when blocking unit 160 allows locking of the differential 21. Moreover, although the control system 40 has been described above in terms of an axle assembly comprising a pair of two-speed axles, it will be apparent that at least the broader aspects of the invention provide for control of an axle assembly having more than two axles and/or having axles capable of more than two ratios.

*Modification*

FIGURE 10 discloses a modified control system 210 which is substantially similar to the control system 40 of FIGURE 1 except for the addition of a solenoid valve 211. Hence, parts of the control system 210 similar to corresponding parts of the control system 40 of FIGURE 1 will be referred to by the same reference numerals thereas with the suffix "a" added thereto.

The added solenoid valve 211 (FIGURE 10) is preferably inserted in the line 46a between the pressure protection valve 43a and the conduit 177a. The solenoid valve 211 (FIGURE 11) includes an upstanding head 212 having an inlet opening 213 at the upper end thereof in which is disposed a ball valve 214. The ball valve 214 normally separates the inlet opening 213 from an elongated downwardly extending passage 216. The ball valve 214 comprises an annular shell 217 having an upwardly facing conical valve seat 118 above which is loosely disposed a ball 219. The ball 219 is normally forced into sealing contact with the seat 218 by gravity and by the force of pressure fluid thereabove. A rod 221 slideably extends upwardly into the annular shell 217 and is normally positioned below the level of the seat 218. The rod 221 extends downwardly through the passage 216 and out the lower end thereof. An outlet opening 222 extends substantially radially from the passage 216 intermediate the ends thereof. The inlet and outlet openings 213 and 222 are preferably threaded for receiving conventional conduit fittings of any convenient type.

A cylindrical winding form 223 coaxially telescopes over the lower end of the head 212 and extends downwardly therefrom. A coil 224, preferably of rectangular cross section, is wound on the form 223 and extends downwardly from the head 212 to a location above the lower end of the form 223. The coil 224 is wound of insulated wire in a conventional manner to prevent unintended shorting between the coils thereof or with other portions of the solenoid valve 211. An annular plate 226 surrounds the lower end of the form 223 below the coil 224. A substantially cylindrical retainer shell 227 snugly surrounds the lower portion of the head 212, the coil 224 and plate 226 and has inwardly deflected end edges which grip the head 212 below the outlet opening 222 and the lower edge of the plate 226 for maintaining same axially adjacent coil 224. A mounting strap 229 extends substantially tangentially past the retainer shell 227 and is affixed thereto by any convenient means such as welding for mounting the valve 211 on the vehicle. An annular, substantially star-shaped, end member 231 is affixed to the lower end of the plate 226 by a plurality, here four, of screws 232, the heads of which bear on a common spider 233.

A cylindrical chamber 236 is defined within the form 223 between the head 212 and the end member 231. A magnetic core 237 is snugly but reciprocably disposed within the chamber 236 and is affixed to the lower end of the rod 221. An O-ring seal 238 snugly surrounds the rod 221 and normally rests upon the upper surface of the core 237. An exhaust opening 239 extends through the end member 231 and spider 233 to allow communication between the lower end of the chamber 236 and the atmosphere. Suitable channels 241 are cut in the upper face of the end member 231 to provide communication between the outlet opening 239 and chamber 236 when the core 237 is in its downwardmost position. If desired, the core 237 may be axially grooved as indicated at 240 to facilitate fluid flow between the upper end of the chamber 236 and the channels 241. Thus, when said core is in its lowermost position, communication between the outlet 222 is established through the passage 216, chamber 236, groove 240, if provided, and channels 241 to the outlet opening 239 and hence to the atmosphere.

Insulated conductors 242 and 243 extend from the coil 224 downwardly through the plate 226 and emerge between the lobes of the end member 231. If desired, one of these conductors, here the conductor 243, may be connected to the spider 233 by means of one of the screws 232, thereby being grounded to the vehicle frame through the retainer shell 227 and mounting strap 229.

The coil 224 is arranged so that application of a voltage of the proper polarity thereto moves the core 237 upwardly whereby the upper end of the rod 221 contacts and lifts the ball 219 off the seat 218 to place the inlet 213 in communication with the outlet 222.

Such upward movement of the core 237 also brings the ring 238 into contact with the lower face of the head 212 to close the lower end of the passage 216. Thus, pressure fluid entering the passage 216 through the open ball valve 214 cannot enter the chamber 236.

When the current to the coil 224 ceases, the core 237 and rod 221 drop due to gravity, allowing the ball 219 to drop into sealing contact with the seat 218 to prevent fluid flow from the inlet 213 to the passage 216.

Referring now to FIGURE 10, the solenoid valve 211 is connected into the line 46a of the control system 210 with the inlet 213 thereof preferably being connected to the outlet of the pressure protection valve 43a and the outlet 222 thereof being connected to the portion of the conduit 46a feeding the conduit 177a and the inlet of the selector valve 48a. It will be understood, of course, that the control system 210 may be used without the pressure protection valve 43a, as discussed hereinabove with respect to the system 40. The conductors 242 and 243 are connected in series with an electrical energizing circuit at least including a normally open switch 244 in series with a voltage source such as the battery 245 of the vehicle. The switch 244 is preferably arranged to control the operation of the vehicle engine and, hence, may be, for example, the ignition switch of a gasoline engine or the accessory switch of a diesel engine. Thus, when the switch 244 is closed, and hence the vehicle engine is on, current will flow from the battery 246 through said switch to the conductors 242 and 243 of the solenoid coil 224 to energize same and hence open the ball valve 218 as above described. Thus, energization of the solenoid coil 224 allows flow from the source 41a to the conduit 177a and to the selector 48a. Opening of the switch 244, on the other hand shuts off current through the conductors 242 and 243 thus de-energizing the coil 224, dropping the core 237 as above described and hence closing the ball valve 214. This in turn results in shutting off fluid flow from the pressure protection valve 43a to the selector valve 48a and conduit 177a. Moreover, the lowered condition of the core 237 permits pressure fluid to flow from the valve 48a and conduit 177a through the passage 216 and chamber 236 out the exhaust opening 239 of the solenoid valve 211 to exhaust the valve 48a and conduit 177a.

The control system 210 assures that the front and rear axles 11a and 12a will both be in their low gear condition soon after the switch 244 has been opened even when the selector valve is in its high or intermediate setting.

More specifically, opening of the switch 244 causes the solenoid valve to exhaust the line 46a whereby to insure that the selector valve 48a exhausts the lines 103a and 104a and, hence, to insure that the valves 107a and 108a evacuate the lines 111a and 112a leading to said axles. Evacuation of the lines 111a and 112a causes the axles 11a and 12a, if in high gear, to downshift to their low gear position.

It will be noted that without the valve 211, a slow air leak in a line leading to one of the axles which is in high gear might allow the axle to shift out of high gear position and remain in a neutral or disengaged condition for a time before a further drop in pressure could shift the axle into low gear. Thus, the vehicle, if left in gear to hold same while parked unattended on a hill, might roll as one of the axles shifted itself out of high gear. On the other hand, the solenoid valve 211 provides a parking protection feature should the vehicle operator park the vehicle in gear and open the switch 244 with one or both of the axles in high gear, the de-energized valve 211 normally at least initiates shifting of the axle units toward low gear before the operator leaves the vehicle. Further, should the operator ignore the shifting of the axles from high gear, the valve 211 assures that the axles will be shifted to low gear before the vehicle has an opportunity to roll.

It is contemplated, moreover, that a normally closed, manually actuable switch 247 such as a toggle switch might be placed in series with the ignition switch 244 and battery 246. In the presence of leakage in the system fed by the conduit 46a, the toggle switch would be opened by the vehicle operator to de-energize the valve 211. This would prevent loss of air from the source 41a by closing the inlet 213 and would exhaust the valve 48a and conduit 177a through the valve 211.

The particular valve 211 shown in FIGURES 10, 11 and 12 is preferably mounted in a substantially upright position as shown in FIGURE 10 since gravitation is used to cause downward movement of the ball 219 and core 237. However, if desired, a spring could be used to urge at least the core 237 toward the end member 231 as shown, for example, in the afore-mentioned Patent No. 3,146,842.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a control system for shifting an axle assembly including a plurality of multispeed drive axles, an interaxle differential connecting said axles, and fluid actuated means to lock out said differential, the combination comprising:

a fluid pressure supply means;

a plurality of conduit means, each conduit means being connected to a corresponding one of said axles for shifting the ratio of said axle as a result of a change in a fluid condition in the associated one of said conduit means;

a single selector valve actuable for alternatively allowing communication between said supply means and said conduit means in a plurality of selected combinations and for allowing exhausting of the ones of said conduit means not in communication with said supply means, said selector valve having an inlet port connected to said supply means, outlet ports connected to said conduit means and a manually movable valve element for selectively connecting said inlet port to said outlet ports in selected combinations;

whereby actuation of said selector velve results in shifting the ratios of said axles to shift said axle assembly.

2. The system defined in claim 1 including:
initiating valve means connected between said supply means and said differential for permitting fluid to be communicated to said lock out means for locking said differential to positively connect said axles, said initiating valve means having a manually movable valve element.

3. In a motor vehicle having a drive train including a lever actuated change speed transmission driveably connected to one axle of an axle assembly including a tandem pair of driven two-speed axles joined by an interaxle differential, a control system actuable for shifting said axle assembly through three gear ratios comprising in combination:
selector valve means mounted on the transmission gear shift lever and forming a manually actuable knob thereon, said selector valve having movable valve element means therein;
air pressure supply means having an outlet in communication with said selector valve means;
first conduit means connecting said selector valve means and a first one of said axles;
second conduit means connecting said selector valve means and the second one of said axles;
a manually engageable movable handle on said knob connected to said movable valve element means, said valve element means being movable by said handle to allow communication in preselected combinations between said air supply and said conduit means, to seal said air supply means from said conduit means singly and in combination and to vent said conduit means to the atmosphere singly and in combination;
whereby actuation of said selector valve means controls the shifting of said axle assembly.

4. The system defined in claim 3 including:
locking means for locking up said differential, a blocking valve and means for connecting same to said first axle, said blocking valve being open when said first axle is in one gear ratio and being closed when said first axle is in another gear ratio;
a manually actuable, initiating valve and third conduit means for connecting said supply means in series with said blocking and initiating valves to said locking means, opening of both said blocking and initiating valves locking said differential to positively connect said axles.

5. The system defined in claim 4 in which said locking means includes:
a lock pressure fluid cylinder operatively connected to said differential to lock same for positively connecting said axles upon pressurization of said lock cylinder, said lock cylinder being connected to said third conduit means for pressurization thereby; and in which
said one gear ratio corresponds to the low gear condition of said first axle and said selector valve is arranged for selecting the low gear condition of said first axle only simultaneously with the selection of the low gear condition of said second axle;
whereby said differential can be locked only when said axles are both in low gear.

6. The system defined in claim 3 including a pressure protection valve operatively connected to said supply means to shut same off when the pressure on the outlet side of said pressure protection valve drops below a predetermined value;
quick release valves connected to said first and second conduit means for exhausting air pressure fed by said conduit means to said axles when said selector valve means is actuated to exhaust said conduit means.

7. The system defined in claim 3 in which:
said selector valve means includes an exhaust opening, a movable valve member and detent means for locating said valve member sequentially in one of three positions, the first of said positions connecting said first and second conduit means to said exhaust opening, the second of said positions connecting said first conduit means to said supply means and said second conduit to said exhaust opening, and the third of said positions connecting both of said conduit means to said supply means;
first and second pressure fluid shift cylinders mounted on said first and second axles, respectively, and operatively connected thereto for changing the gear ratio thereof, said first and second shift cylinders being connected to said first and second conduit means, respectively, for energization thereby, said first and second axles being shiftable to high gear upon appearance of a predetermined pressure in said first and second conduits, respectively, and said first and second axles being shiftable to low gear upon exhausting of said first and second conduits, respectively.

8. The device defined in claim 3 including a source of electrical potential and a switch;
a solenoid valve connected in series between said supply means and said selector valve means and actuable for placing said selector valve means in communication with said supply means, said solenoid valve having an exhaust outlet connectible with said selector valve for exhausting same upon deactuation of said solenoid valve;
means for electrically connecting said solenoid valve to said source of electrical potential and said switch for actuating said solenoid valve upon actuation of said switch.

9. In an multiple axle mechanism comprising a plurality of multispeed drive axles, fluid pressure operated shifting means for controlling the shifting of each axle, interaxle differential means drivingly connecting said axles and fluid pressure operated locking means for locking up said interaxle differential means, a control system for shifting said axles and for operating said locking means comprising in combination:
fluid pressure supply means;
a plurality of conduit means, each conduit means being connected to a fluid pressure operated shifting means of an axle;
selector valve means for selectively connecting said supply means to said conduit means in order to shift the axles in a selected sequence, said selector valve means being arranged so that when one axle is in one of its ratio settings the other axle will be in a corresponding ratio setting;
blocking valve means and a manually actuable initiating valve connected by conduits in series between said supply means and said locking means so that the operation of said locking means is responsive to the operation of said blocking valve means and said initiating valve, said blocking valve means including means responsive to the ratio setting of said one axle for effecting operation of said locking means only when said one axle is in said one setting.

10. A multiple axle mechanism according to claim 9, in which said blocking valve means includes a movable valve element which mechanically engages a movable part of said shifting means for said one axle so that the position of said valve element is directly responsive to the ratio setting of said one axle.

11. In a multiple axle mechanism comprising a plurality of multispeed drive axles, fluid pressure operated shifting means for controlling the shifting of each axle, interaxle differential means drivingly connecting said axles, a control system for shifting said axles comprising in combination:
fluid pressure supply means;

a plurality of conduit means, each conduit means being connected to a fluid pressure operated shifting means of an axle;

selector valve means for selectively connecting said supply means to said conduit means in order to shift the axles in a selected sequence;

quick release valves connected to each of said conduit means, said quick release valves having an exhaust and a valve element responsive to the pressure of the fluid supplied from said selector valve means for connecting said shifting means for said axles to said exhaust when said selector valve means is operated to terminate flow of pressure fluid to said shifting means.

12. In a multiple axle mechanism comprising a plurality of multispeed drive axles, fluid pressure operated shifting means for controlling the shifting of each axle, interaxle differential means drivingly connecting said axles, a control system for shifting said axles, comprising in combination:

fluid pressure supply means;

a plurality of conduit means, each conduit means being connected to a fluid pressure operated shifting means of an axle;

selector valve means for selectively connecting said supply means to said conduit means in order to shift the axles in a selected sequence;

control valve means connected between said supply means and said selector valve means and movable from a first position in which said supply means is in communication with said selector valve means and a second position in which said selector valve means is connected to exhaust;

an ignition switch coupled to said control valve means for controlling the movement of same between said positions;

said shifting means including means to automatically return said axles to their low ratio settings upon connection of said selector valve means to exhaust whereby operation of said switch means will cause said axles to be returned to their low ratio settings.

References Cited

UNITED STATES PATENTS

| | | | |
|---|---|---|---|
| 1,711,128 | 4/1929 | Robbins | 180—22 |
| 3,049,934 | 8/1962 | Butler et al. | 74—473 X |
| 3,146,842 | 9/1964 | Nelson et al. | 180—22 |

A. HARRY LEVY, *Primary Examiner.*